(12) United States Patent
Kaplan, Jr.

(10) Patent No.: US 11,173,888 B2
(45) Date of Patent: Nov. 16, 2021

(54) PARKING BRAKE ACTUATION SYSTEM FOR A VEHICLE

(71) Applicant: James Harlan Kaplan, Jr., Kansas City, KS (US)

(72) Inventor: James Harlan Kaplan, Jr., Kansas City, KS (US)

( * ) Notice: Subject to any disclaimer, the term of this patent is extended or adjusted under 35 U.S.C. 154(b) by 314 days.

(21) Appl. No.: 16/533,551

(22) Filed: Aug. 6, 2019

(65) Prior Publication Data

US 2020/0189548 A1    Jun. 18, 2020

Related U.S. Application Data

(60) Provisional application No. 62/781,075, filed on Dec. 18, 2018.

(51) Int. Cl.

| F16D 51/00 | (2006.01) |
|---|---|
| B60T 13/74 | (2006.01) |
| F16H 63/34 | (2006.01) |
| F16H 61/28 | (2006.01) |
| F16D 65/18 | (2006.01) |
| F16D 51/22 | (2006.01) |
| F16D 125/64 | (2012.01) |

(52) U.S. Cl.
CPC ............ B60T 13/741 (2013.01); F16D 51/22 (2013.01); F16D 65/18 (2013.01); F16H 61/2807 (2013.01); F16H 63/34 (2013.01); F16D 2051/003 (2013.01); F16D 2125/64 (2013.01)

(58) Field of Classification Search
CPC ............ F16D 2125/26; F16D 2125/28; F16D 2125/30; F16D 2125/64; F16D 2125/68; F16D 2125/70; F16D 2121/14; F16D 2051/003; F16D 51/22; F16D 51/28; B60T 13/741
See application file for complete search history.

(56) References Cited

U.S. PATENT DOCUMENTS

| 2016/0010711 | A1* | 1/2016 | Root | F16D 65/60 |
|---|---|---|---|---|
| | | | | 188/79.55 |
| 2017/0030422 | A1* | 2/2017 | Berwanger | F16D 65/60 |
| 2018/0195566 | A1* | 7/2018 | Berwanger | F16D 51/24 |
| 2020/0191217 | A1* | 6/2020 | Lewis | B60B 27/0057 |

* cited by examiner

*Primary Examiner* — Nicholas J Lane
(74) *Attorney, Agent, or Firm* — Plager Schack LLP; Mark H. Plager; Eric Liou

(57) ABSTRACT

A parking brake actuation system mounted to a tail shaft of a vehicle's transmission is operably connected to a brake assembly of the vehicle having brake pads housed within a brake drum. The parking brake actuation system includes a mounting bracket coupled to the tail shaft of the vehicle's transmission, an actuator coupled to the mounting bracket, and a bell crank coupled to the tail shaft of the vehicle's transmission and the actuator, and also connected to an engagement cam by a linkage assembly. Actuation of the actuator to a retracted position permits rotational movement of the bell crank to transfer through the linkage assembly to engage the pair of brake pads with the brake drum. Actuation of the actuator to an extended position permits rotational movement of the bell crank to transfer through the linkage assembly to disengage the pair of brake pads from the brake drum.

10 Claims, 5 Drawing Sheets

PARKING BRAKE ACTUATION SYSTEM FOR A VEHICLE

RELATED APPLICATION

The application claims priority to provisional patent application U.S. Ser. No. 62/781,075 filed on Dec. 18, 2018, the entire contents of which is herein incorporated by reference.

BACKGROUND

The embodiments herein relate generally to parking brakes for vehicles. More specifically, embodiments of the invention are directed to a parking brake actuation system for a vehicle.

Vehicles including tow tractors, belt loaders or other ground support vehicles at airports often use a cable-operated parking brake assembly. This parking brake assembly typically includes brake handles connected to brake shoes by cables. As one or more brake handles are squeezed by the operator, the direct connection to the brake shoes allows the shoes to engage or disengage from the brake drum.

These cable-operated parking brake assemblies on these vehicles have several problems. In particular, the cables of the brake assemblies can collect water and freeze internally. This causes the park brake to remain engaged even when the handle has been released, thereby causing the operator to mistakenly believe that the parking brake is disengaged when driving the vehicle. In addition, some operators abuse the parking brake assembly by using it as a service brake when the vehicle is in motion. These scenarios give way to rising maintenance costs of the vehicle due to the need for frequent replacement of prematurely worn or damaged park brake handles, cables, brake shoes or other brake components.

As such, there is a need in the industry for a parking brake actuation system for a vehicle that addresses the limitations of the prior art, which provides an effective and reliable parking brake solution that eliminates the use of traditional brake handles and cables that are used with conventional brake shoes and drums. There is a further need for the parking brake actuation system to be easily mounted directly on the vehicle's axle or transmission.

SUMMARY

In certain embodiments of the invention, a parking brake actuation system mounted to a tail shaft of a transmission of a vehicle is provided. The parking brake actuation system is operably connected to a brake assembly of the vehicle comprising a pair of brake pads housed within a brake drum. The pair of brake pads is coupled to a pair of supports separated from each other by an engagement cam.

In certain embodiments, the parking brake actuation system comprises a mounting bracket coupled to the tail shaft of the transmission of the vehicle, an actuator comprising a first end coupled to the mounting bracket and a second end, and a bell crank coupled to the tail shaft of the transmission of the vehicle and the second end of the actuator, the bell crank operably connected to the engagement cam by a linkage assembly, wherein actuation of the actuator to a retracted position permits a first rotational movement of the bell crank to transfer through the linkage assembly to drive the engagement cam to increase a separation distance between the pair of supports, thereby engaging the pair of brake pads with the brake drum, wherein actuation of the actuator to an extended position permits a second rotational movement of the bell crank to transfer through the linkage assembly to drive the engagement cam to decrease the separation distance between the pair of supports, thereby disengaging the pair of brake pads from the brake drum.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
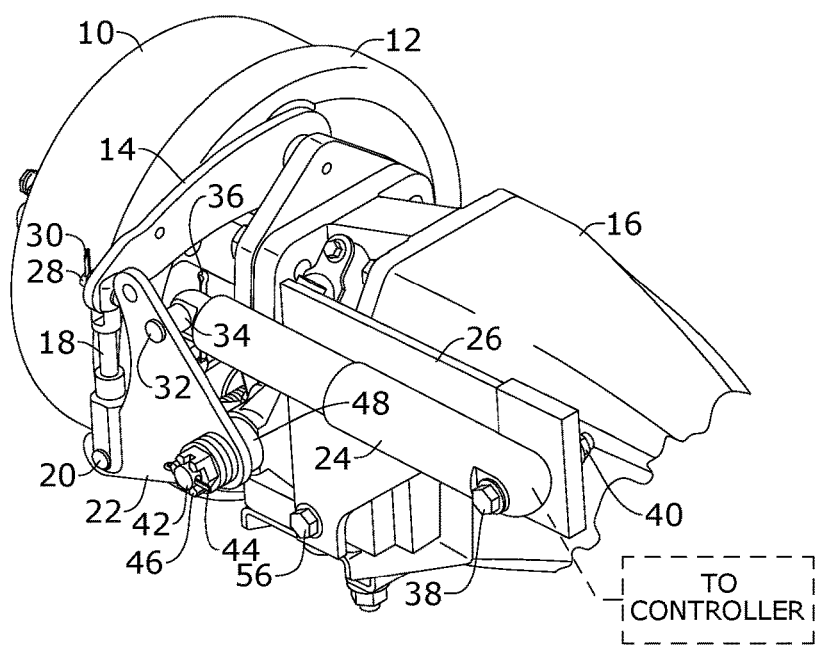
FIG. 1 depicts a perspective view of certain embodiments of the parking brake actuation system.
Figure 2:
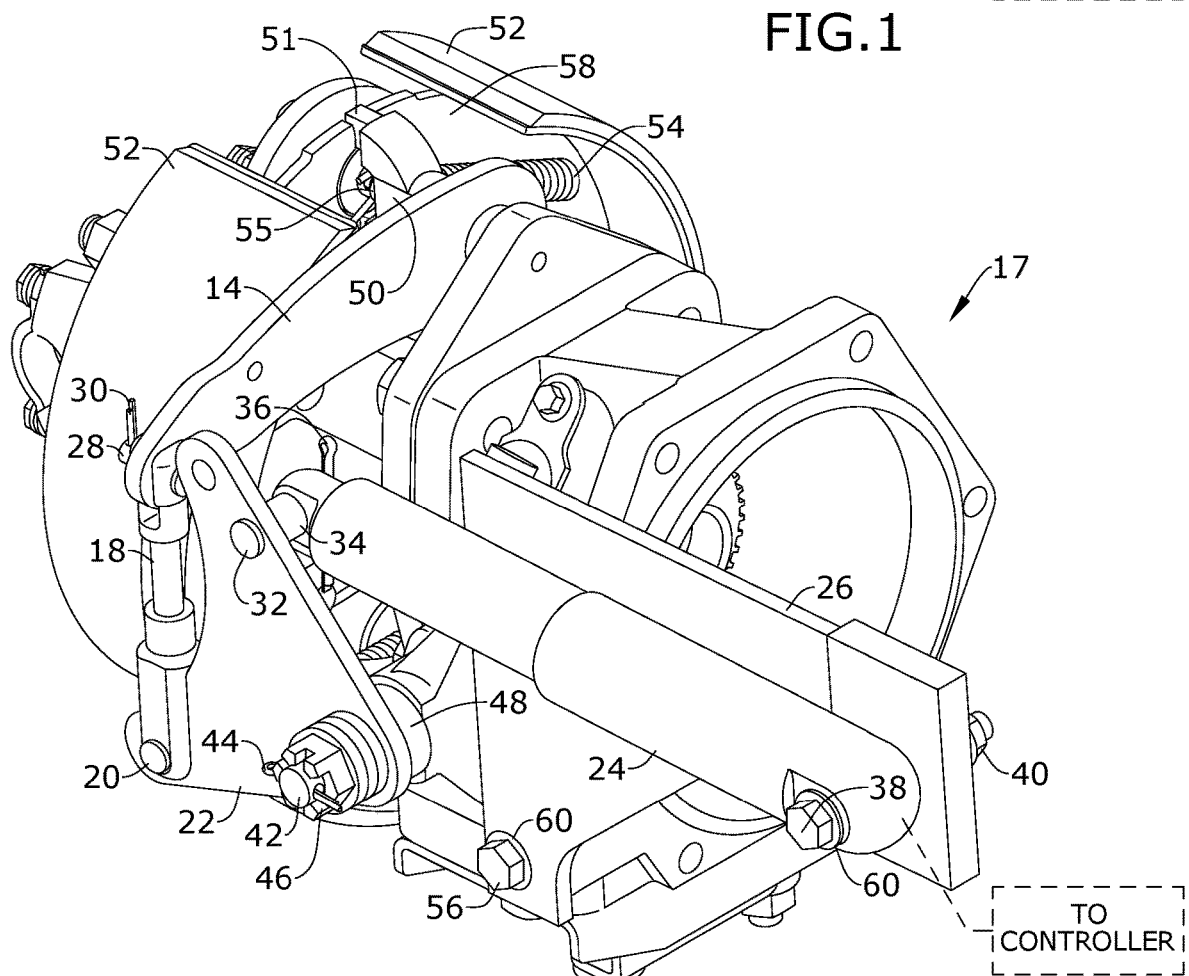
FIG. 2 depicts a perspective view of certain embodiments of the parking brake actuation system with brake drum 10 removed to improve clarity of certain other components.
Figure 3:
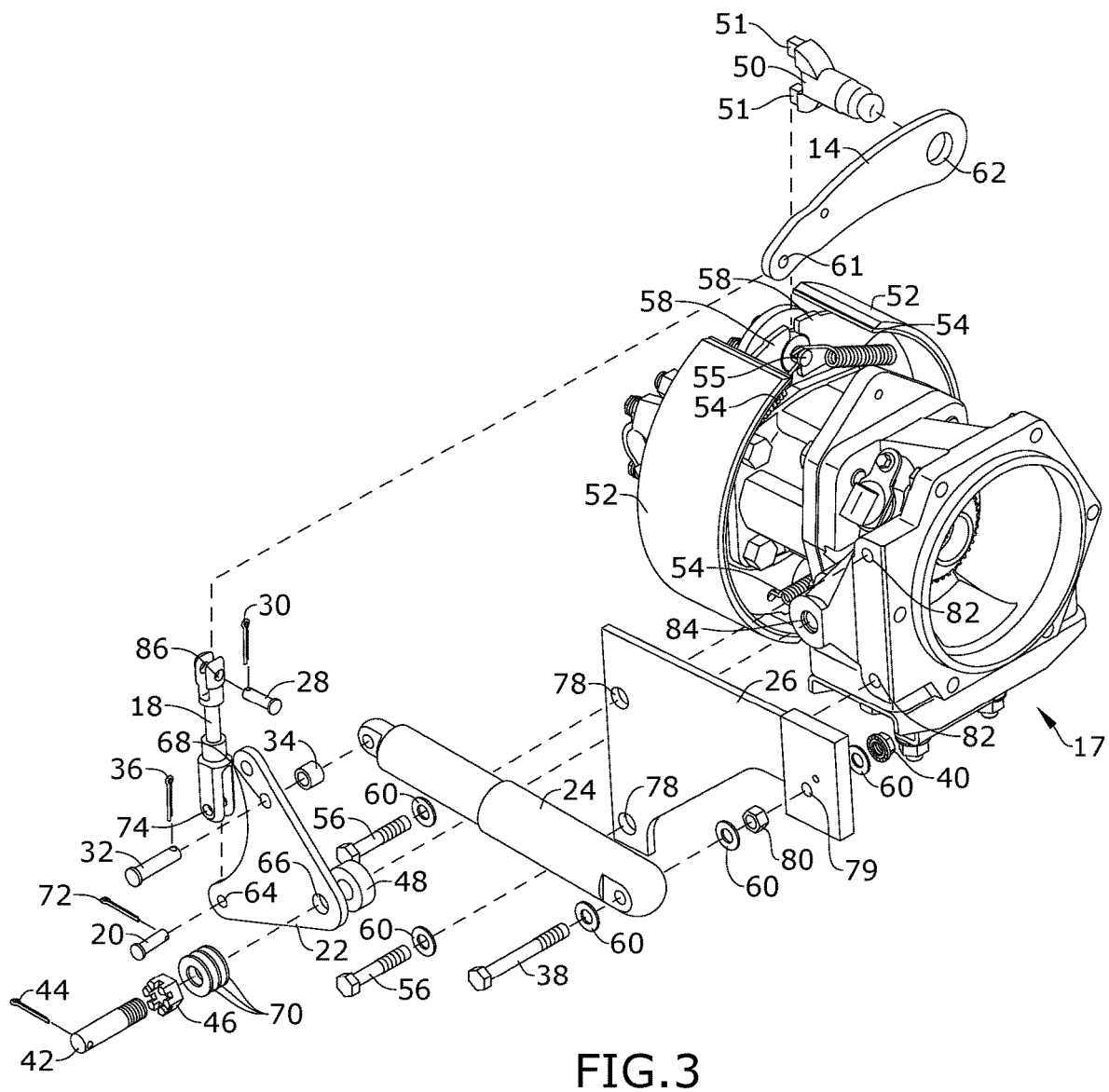
FIG. 3 depicts an exploded view of certain embodiments of the parking brake actuation system.

In certain embodiments as depicted in FIGS. 1-3, the parking brake actuation system is configured to mount to a vehicle to control the operation of the parking brake on the vehicle. In a preferred embodiment, the vehicle is a tow tractor, belt loader or other ground support vehicle commonly used at airports. However, the vehicle can be any other type of vehicle including, but not limited to, race cars, utility vehicles or other automobiles. In certain embodiments, the parking brake actuation system generally comprises bell crank 22, actuator 24, mounting bracket 26 and a linkage assembly comprising brake engagement lever 14 and rod 18.

In one embodiment as depicted in FIGS. 1-3, the vehicle comprises dust shield 12, transmission housing 16 and a brake assembly. Transmission tail shaft 17 of the vehicle is housed within transmission housing 16. The brake assembly comprises brake drum 10, a pair of brake pads 52 and brake pad base supports 58. The pair of brake pads 52 is coupled to the pair of brake pad base supports 58. In one embodiment, return springs 54 are connected to brake pad base supports 58 and rivet 55, which is positioned between the pair of brake pad base supports 58.

The parking brake actuation system is preferably coupled to transmission tail shaft 17 and operably connected to the brake assembly as will be described in embodiments of the invention. In certain embodiments as depicted in FIGS. 1-2, the parking brake actuation system transfers movement through brake engagement lever 14 of the linkage assembly. Brake engagement lever 14 is coupled to brake engagement cam 50, which is configured to rotate and drive brake pad base supports 58 to control the movement of brake pads 52 relative to brake drum 10.

In certain embodiments as depicted in FIGS. 1-3, actuator 24 of the parking brake actuation system is mounted to transmission tail shaft 17 of the vehicle using mounting bracket 26 and mechanical fasteners such as transmission bracket bolts 56 and washers 60. The mechanical fasteners can be made from various materials including, but not limited to, steel, other metals, plastic or other materials. It shall be appreciated that actuator 24 can be mounted to an axle or other location on the vehicle in an alternative embodiment as desired.

In one embodiment, mounting bracket 26 comprises a generally triangular-shaped member made from mild steel, another metal or material. Mounting bracket 26 comprises a pair of transmission mount openings 78 and actuator mount opening 79. As depicted in FIG. 3, a pair of transmission bracket bolts 56 extends through a pair of washers 60, the pair of transmission mount openings 78 in mounting bracket 26, and a pair of openings 82 in transmission tail shaft 17 of the vehicle. In an alternative embodiment, any number of additional screws or fasteners can be used to secure mounting bracket 26 to transmission tail shaft 17 as desired.

As depicted in FIGS. 1-3, actuator 24 of the parking brake actuation system is coupled to the vehicle and the braking assembly. In one embodiment, actuator 24 preferably is a linear actuator configured to apply a force of approximately 300 N. In an alternative embodiment, actuator 24 is configured to apply a force within the approximate range of 300 N-600 N depending on the size and weight of the vehicle, and the operating conditions, e.g., engaging the brake assembly when the vehicle is situated on a sloped ground or a flat ground.

In certain embodiments as depicted in FIGS. 1-3, actuator 24 comprises a first end coupled to mounting bracket 26 using a plurality of mechanical fasteners including bolt 38, washers 60, nut 80 and lock nut 40. In one embodiment as depicted in FIG. 3, bolt 38 extends through a first washer 60, the first end of actuator 24, a second washer 60, nut 80, actuator mount opening 79 in mounting bracket 26, and a third washer 60 to engage with lock nut 40. The plurality of mechanical fasteners can be made from various materials including, but not limited to, steel, other metals, plastic or other materials.

In certain embodiments as depicted in FIGS. 1-3, the second end of actuator 24 is coupled to bell crank 22 by pin 32, spacer 34 and cotter pin 36. In one embodiment, bell crank 22 is made from steel, another metal or material, and comprises lower pin opening 64, upper pin opening 68 and transmission mount opening 66. In an alternative embodiment, bell crank 22 may comprise any alternate number of openings configured to receive additional mechanical fastening components. Spacer 34 is disposed between and directly in contact with bell crank 22 and the second end of actuator 24. Pin 32 extends through upper pin opening 68 in bell crank 22, spacer 34 and the second end of actuator 24. Cotter pin 36 engages with the end of pin 32 to secure bell crank 22 and actuator 24 together.

As depicted in FIG. 3, bell crank 22 is coupled to transmission tail shaft 17 by using mechanical fasteners including bell crank connecting bracket pin 42, cotter pin 44, hex head 46, washers 70 and spacer 48. Bell crank connecting bracket pin 42 engages with cotter pin 44 and extends through hex head 46, a plurality of washers 70, transmission mount opening 66 in bell crank 22 and spacer 48. The end tip of bell crank connecting bracket pin 42 comprises threads that engage with threaded opening 84 on transmission tail shaft 17. The mechanical fasteners used to secure bell crank 22 to transmission tail shaft 17 can be made from various materials including, but not limited to, steel, other metals, plastic or other materials. Although the figures depict the use of three washers 70 with bell crank connecting bracket pin 42, it shall be appreciated that any alternative number of washers 70 can be used instead.

In certain embodiments as depicted in FIGS. 1-3, bell crank 22 is coupled to the brake assembly using the linkage assembly and a plurality of mechanical fasteners. In one embodiment, rod 18 of the linkage assembly comprises a lower end coupled to bell crank 22 and an upper end coupled to brake engagement lever 14. The lower end of rod 18 comprises a lower clevis threaded thereon and has a pair of prongs that extends around bell crank 22. The prongs of the lower clevis comprise lower pin openings 74 that align with lower pin opening 64 in bell crank 22. Lower pin 20 extends through the pair of lower pin openings 74 in the lower clevis on rod 18 and lower pin opening 64 in bell crank 22. Cotter pin 72 engages with lower pin 20 to secure rod 18 and bell crank 22 together.

Similarly, the upper end of rod 18 comprises an upper clevis threaded thereon and has a pair of prongs that extends around brake engagement lever 14. The prongs of the upper clevis comprise upper pin openings 86 that align with rod opening 61 in brake engagement lever 14. Upper pin 28 extends through the pair of upper pin openings 86 in the upper clevis on rod 18 and rod opening 61 in brake engagement lever 14. Cotter pin 30 engages with upper pin 28 to secure rod 18 and brake engagement lever 14 together.

In certain embodiments as depicted in FIGS. 1-3, brake engagement lever 14 comprises cam opening 62, which is configured to receive an end of brake engagement cam 50. As depicted in FIGS. 2-3, brake engagement cam 50 is a cam that comprises a pair of tabs 51 that extends around rivet 55 between the pair of brake pad base supports 58 of the brake assembly.

It shall be appreciated that brake engagement cam 50, brake engagement lever 14 and rod 18 of the linkage assembly can be made from any materials including, but not limited to, steel, other metals or materials. Mechanical fasteners such as lower pin 20, upper pin 28, cotter pin 30 and cotter pin 72 can be made from various materials including, but not limited to, steel, other metals, plastic or other materials.

In certain embodiments, actuation of actuator 24 controls the operation of the brake assembly. Specifically, actuation of actuator 24 in the parking brake actuation system to an extended position allows brake pads 52 to disengage from inner wall 88 of brake drum 10. Actuation of actuator 24 in the parking brake actuation system to a retracted position allows brake pads 52 to engage with inner surface 88 of brake drum 10.

Figure 5:
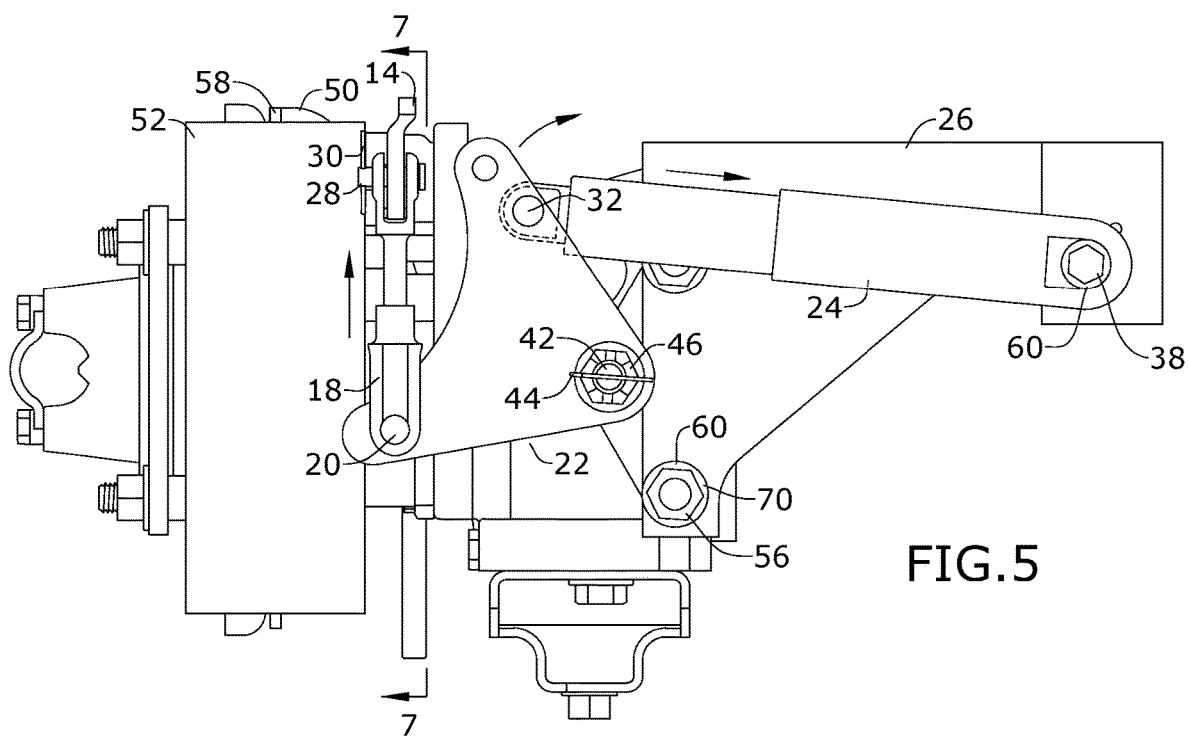
FIG. 5 depicts a side view of certain embodiments of the parking brake actuation system illustrating the engagement of the brake.
Figure 7:
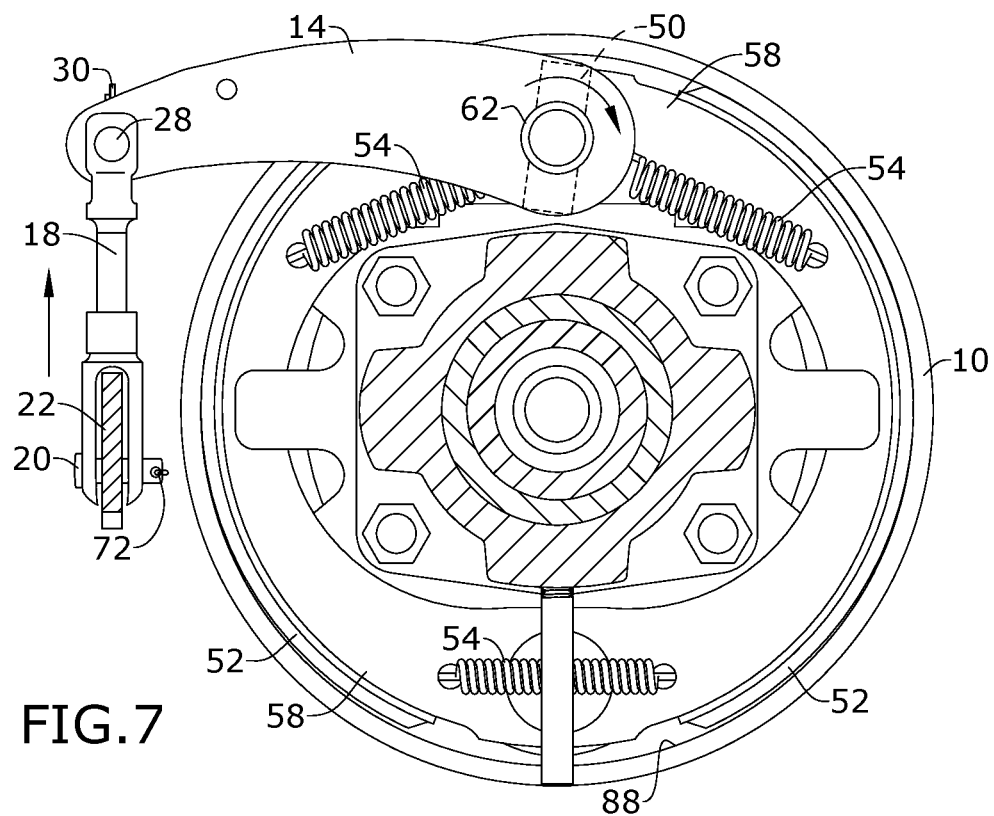
FIG. 7 depicts a section view of certain embodiments of the parking brake actuation system taken along line 7-7 in FIG. 5.

In certain embodiments as depicted in FIGS. 5 and 7, actuation of actuator 24 to the retracted position allows bell crank 22 to rotate clockwise as depicted by the arrow in the figures. Rotational movement of bell crank 22 is transferred to lift rod 18 upward as depicted by the arrows, which allows brake engagement lever 14 to rotate clockwise as depicted by the arrow in FIG. 7. Clockwise rotation of brake engagement lever 14 drives the pair of tabs 51 of brake engagement cam 50 to push the pair of brake pad base supports 58 apart from each other, thereby engaging the pair of brake pads 52 with inner surface 88 of brake drum 10. This sets the parking brake in the ON position.

Figure 4:
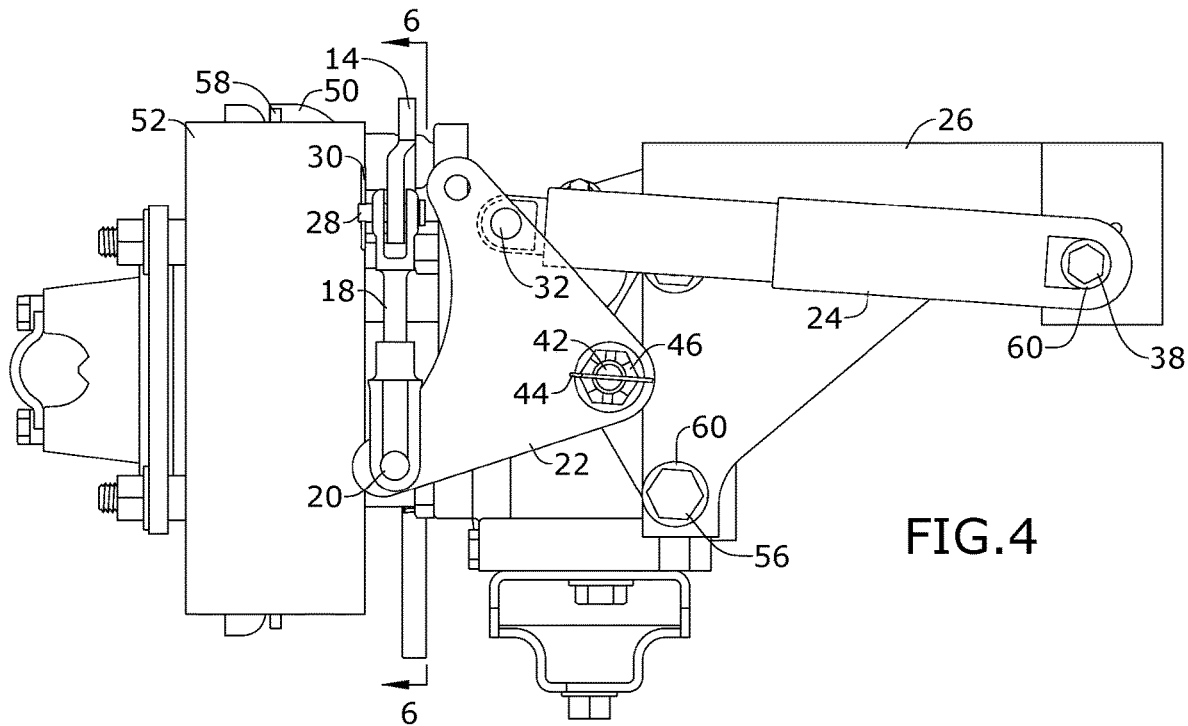
FIG. 4 depicts a side view of certain embodiments of the parking brake actuation system illustrating the disengagement of the brake.
Figure 6:
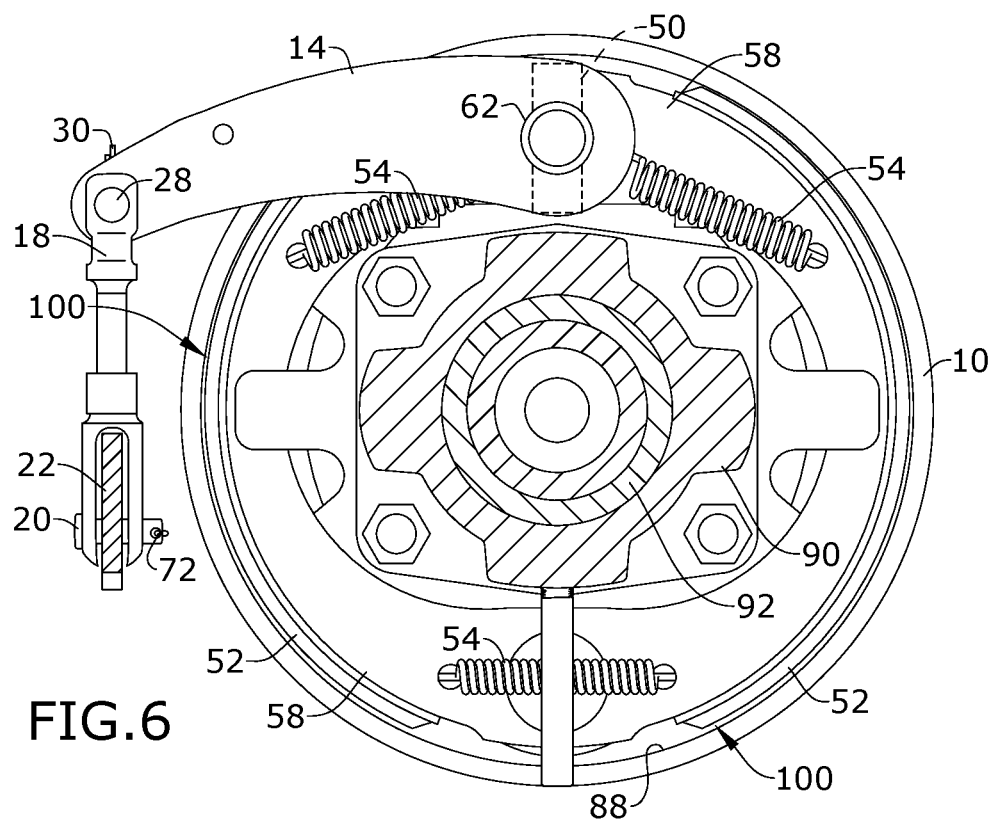
FIG. 6 depicts a section view of certain embodiments of the parking brake actuation system taken along line 6-6 in FIG. 4.

In contrast, the extension of actuator 24 causes movement in bell crank 22, rod 18 and brake engagement lever 14 in the opposite direction previously described. FIGS. 4 and 6 depict actuator 24 in the extended position. More specifically, actuation of actuator 24 to the extended position allows bell crank 22 to rotate counterclockwise. This rotational movement of bell crank 22 lowers rod 18 downward, which allows brake engagement lever 14 to rotate counterclockwise. Counterclockwise rotation of brake engagement lever 14 drives the pair of tabs 51 of brake engagement cam 50 to the North/South positions relative to rivet 55, thereby allowing return springs 54 to draw the pair of brake pad base supports 58 closer to each other. As depicted in FIG. 6, this disengages the pair of brake pads 52 from inner surface 88 of brake drum 10 by separation distance 100. This sets the parking brake in the OFF position.

In certain embodiments, a controller is coupled to the vehicle and electrically coupled to actuator 24 via one or more wires shielded within a protective sheath. In certain embodiments, the controller and actuator 24 are electrically coupled to and powered by the vehicle's battery or alternate power source.

Actuator 24 comprises a limit switch for use in the extension and retraction directions that automatically stops actuation when actuator 24 reaches the end limit of travel in either direction. This is facilitated by the controller, which is configured and programmed to measure amperage draw at actuator 24. Once the amperage reaches a preset limit and a corresponding desired force, the controller turns off actuator 24 at the extended position or retracted position. This locks actuator 24 in place in the extended position or retracted position, and disconnects it from the vehicle's battery or alternate power source. As a result, the brake assembly is maintained in the OFF position or ON position without further drainage of the vehicle's battery or alternate power source. Another advantage of the controller and preset amperage limits are that the brake assembly does not have to be readjusted manually by a user since actuator 24 applies the same force every time in the extended and retracted positions as controlled by the controller.

In one embodiment, the controller emits an audible beep once actuator 24 reaches the extended or retracted position. In one embodiment, the controller comprises an adjustable screw to increase or decrease the preset amperage limits for the extended and retracted positions depending on the vehicle's specifications and the user's requirements.

In one embodiment, a push button is coupled to the vehicle and electrically coupled to the controller and actuator 24 by one or more wires. The push button is preferably mounted to the dashboard of the vehicle, but can be placed in any alternative location that is easily accessible by the operator or driver of the vehicle. In one embodiment, an ignition switch of the vehicle is electrically coupled to the controller.

In certain embodiments, the controller comprises any circuit board and/or other electrical components known in the field capable of implementing the functionality of the parking brake actuation system. It shall be appreciated that the controller can be programmed as desired depending on the user's requirements.

In one embodiment, depression of the push button activates the controller to permit actuator 24 to switch between the extended and retracted positions. For example, a first depression of the push button instructs the controller to actuate actuator 24 to the retracted position. A second depression of the push button allows the controller to actuate actuator 24 to the extended position. A third depression of the push button allows the controller to actuate actuator 24 back to the retracted position and so forth. These steps can be repeated as many times as needed. In one embodiment, the push button comprises a LED or alternate lighting device that illuminates when the brake assembly is in the ON position. The LED or lighting device turns off when the brake assembly is in the OFF position.

In several exemplary embodiments, the controller is programmed to permit the following operations. If the ignition switch is ON and the push button is depressed, the brake assembly engages to set the parking brake ON. If the push button is depressed again with the ignition switch ON, the brake assembly disengages to set the parking brake OFF. If the ignition switch is OFF, the brake assembly engages to set the parking brake ON regardless of whether the push button has been depressed. If the vehicle is turned ON after the parking brake was automatically set ON without a prior depression of the push bottom, the parking brake will automatically turn OFF to resume a normal driving operation.

In one embodiment, an emergency switch is electrically coupled to the controller and configured for use when the vehicle is in motion. In this embodiment, the controller is configured so that turning the parking brake ON via the push button, turning the ignition switch OFF, and depressing the emergency switch allows the controller to actuate actuator 24 a period of approximately 4-5 seconds thereafter to engage the brake assembly with brake drum 10. This brings the vehicle safely to a stop. It shall be appreciated that the time period when the braking assembly engages with brake drum 10 can be adjusted as desired.

It shall be appreciated that the components and connections of the parking brake actuation system can vary to accommodate different vehicles. For example, mounting bracket 26 as previously described in certain embodiments is configured to mount to transmission tail shaft 17 of a General Motor 4L70 transmission. In an alternative embodiment as depicted in FIGS. 8-9, alternate mounting bracket 94 is configured to mount to transmission tail shaft 17 of a Ford C6 transmission.

Figure 9:
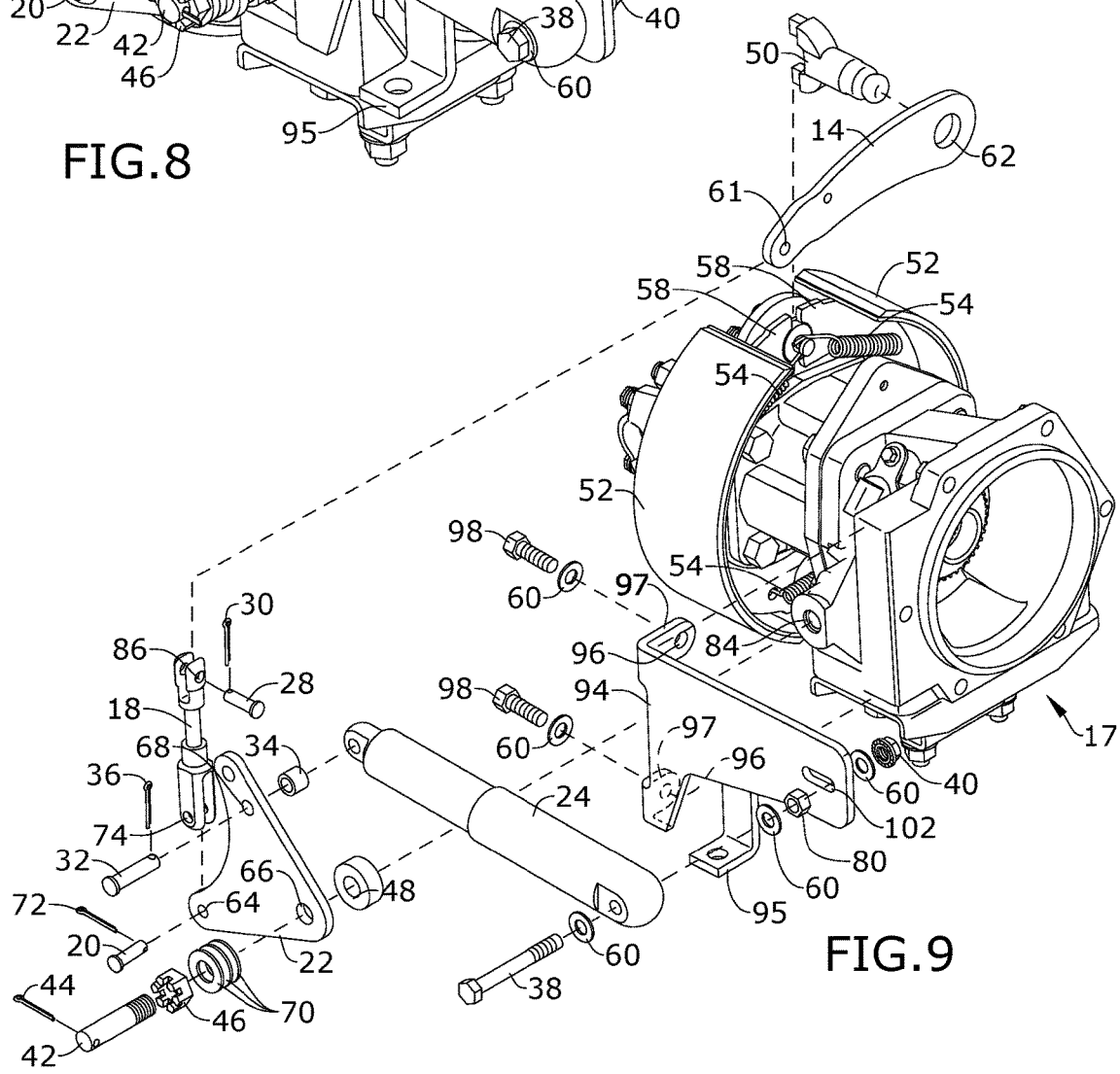
FIG. 9 depicts an exploded view of the alternative embodiment of the parking brake actuation system.

In one embodiment as depicted in FIG. 9, alternate mounting bracket 94 comprises leg 95 and a pair of tabs 97 coupled to a plate. The pair of tabs 97 are planar in one embodiment. Alternate mounting bracket 94 is made from mild steel, another metal or material. In one embodiment, a pair of threaded bolts 98 extends through a pair of washers 60, a pair of transmission mount openings 96 in tabs 97 and a corresponding pair of receiving threaded holes in transmission tail shaft 17 of the vehicle. In one embodiment, leg 95 of alternate mounting bracket 94 is coupled to transmission tail shaft 17 by a set of mechanical fasteners, which preferably includes a threaded bolt that extends through two flat washers, leg 95, a nut and a portion of transmission tail shaft 17. The number and type of fasteners used to couple leg 95 to transmission tail shaft 17 can vary in alternative embodiments.

Figure 8:
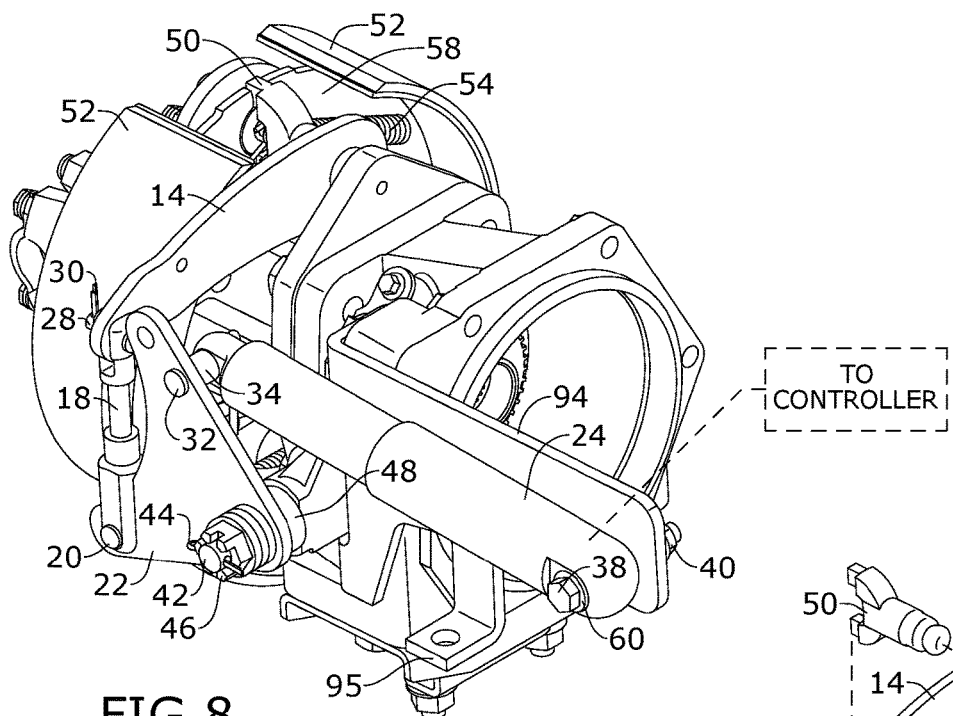
FIG. 8 depicts a perspective view of an alternative embodiment of the parking brake actuation system with brake drum 10 removed to improve clarity of certain other components.

In certain embodiments as depicted in FIGS. 8-9, the first end of actuator 24 is coupled to alternate mounting bracket 94 in the same manner as previously described for mounting bracket 26 using a plurality of mechanical fasteners including bolt 38, washers 60, nut 80 and lock nut 40. In one embodiment, bolt 38 extends through a first washer 60, the first end of actuator 24, a second washer 60, nut 80, elongated mount opening 102 in alternate mounting bracket 94, and a third washer 60 to engage with lock nut 40. The plurality of mechanical fasteners can be made from various materials including, but not limited to, steel, other metals, plastic or other materials.

The remaining components of the parking brake actuation system including actuator 24, bell crank 22, rod 18, brake engagement lever 14 and brake engagement cam 50 are connected to the braking assembly in the same manner previously described in embodiments of the invention. The operation of the parking brake actuation system with alternate mounting bracket 94 is the same as previously described in embodiments of the invention.

It shall be appreciated that the components of the parking brake actuation system described in several embodiments herein may comprise any alternative known materials in the field and be of any color, size and/or dimensions. It shall be appreciated that the components of the parking brake actuation system described herein may be manufactured and assembled using any known techniques in the field. Although the parking brake actuation system in embodiments of the invention have been described for use with a drum brake, it shall be appreciated that the parking brake actuation system described herein can be used with any alternative brake systems including, but not limited to, disc brakes, wet disc brakes or other braking systems.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A parking brake actuation system mounted to a tail shaft of a transmission of a vehicle, the parking brake actuation system operably connected to a brake assembly of the vehicle, the brake assembly comprising a pair of brake pads housed within a brake drum, the pair of brake pads coupled to a pair of supports separated from each other by an engagement cam, the parking brake actuation system comprising:
   a mounting bracket coupled to the tail shaft of the transmission of the vehicle;
   an actuator comprising a first end coupled to the mounting bracket and a second end; and
   a bell crank coupled to the tail shaft of the transmission of the vehicle and the second end of the actuator, the bell crank operably connected to the engagement cam by a linkage assembly;
   wherein actuation of the actuator to a retracted position permits a first rotational movement of the bell crank to transfer through the linkage assembly to drive the engagement cam to increase a separation distance between the pair of supports, thereby engaging the pair of brake pads with the brake drum;
   wherein actuation of the actuator to an extended position permits a second rotational movement of the bell crank to transfer through the linkage assembly to drive the engagement cam to decrease the separation distance between the pair of supports, thereby disengaging the pair of brake pads from the brake drum.

2. The parking brake actuation system of claim 1, further comprising a controller electrically coupled to the actuator and configured to control the actuation of the actuator.

3. The parking brake actuation system of claim 2, further comprising a push button coupled to the vehicle and electrically coupled to the controller, wherein a first depression of the push button is configured to enable the controller to permit actuation of the actuator to the retracted position, wherein a second depression of the push button is configured to enable the controller to permit actuation of the actuator to the extended position.

4. The parking brake actuation system of claim 3, wherein the actuator is configured to apply a force within the approximate range of 300 N-600 N.

5. The parking brake actuation system of claim 4, further comprising a spacer disposed between the second end of the actuator and bell crank, a first pin disposed through the bell crank, spacer and second end of the actuator, and a cotter pin coupled to the first pin.

6. The parking brake actuation system of claim 5, wherein the linkage assembly comprises a rod comprising a first end coupled to the bell crank and a second end, and an engagement lever comprising a first end coupled to the second end of the rod and a second end coupled to the engagement cam.

7. The parking brake actuation system of claim 6, wherein the mounting bracket comprises a generally triangular-shaped member that is coupled to the tail shaft of the transmission of the vehicle by a plurality of mechanical fasteners.

8. The parking brake actuation system of claim 6, wherein the mounting bracket comprises a leg and a pair of tabs, the leg coupled to the tail shaft of the transmission of the vehicle by a first set of mechanical fasteners and each tab in the pair of tabs coupled to the tail shaft of the transmission of the vehicle by a second set of mechanical fasteners.

9. The parking brake actuation system of claim 8, wherein the first set of mechanical fasteners comprises a pair of washers, a bolt extending through the pair of washers, leg and tail shaft of the transmission of the vehicle, and a nut coupled to the bolt, wherein the second set of mechanical fasteners comprises a washer and a bolt extending through the washer, one of the pair of tabs in the mounting bracket and the tail shaft of the transmission of the vehicle.

10. The parking brake actuation system of claim 9, wherein the first and second tabs in the pair of tabs of the mounting bracket are planar.

* * * * *